United States Patent
Hartman

(10) Patent No.: US 9,602,270 B2
(45) Date of Patent: Mar. 21, 2017

(54) CLOCK DRIFT COMPENSATION IN A TIME SYNCHRONOUS CHANNEL HOPPING NETWORK

(71) Applicant: Landis+Gyr Innovations, Inc., Alpharetta, GA (US)

(72) Inventor: James Hartman, Canton, GA (US)

(73) Assignee: Landis+Gyr Innovations, Inc., Alpharetta, GA (US)

(*) Notice: Subject to any disclaimer, the term of this patent is extended or adjusted under 35 U.S.C. 154(b) by 152 days.

(21) Appl. No.: 14/272,582

(22) Filed: May 8, 2014

(65) Prior Publication Data

US 2015/0244513 A1     Aug. 27, 2015

Related U.S. Application Data

(60) Provisional application No. 61/943,176, filed on Feb. 21, 2014.

(51) Int. Cl.
  *H04W 56/00*   (2009.01)
  *H04L 7/00*    (2006.01)
  (Continued)

(52) U.S. Cl.
  CPC ............. *H04L 7/0037* (2013.01); *H04J 3/06* (2013.01); *H04J 3/0638* (2013.01); *H04L 45/20* (2013.01);
  (Continued)

(58) Field of Classification Search
  CPC  H04L 7/0037; H04L 45/20; H04J 3/06; H04J 3/0638; H04W 56/003; H04W 56/001; H04W 56/0015
  See application file for complete search history.

(56) References Cited

U.S. PATENT DOCUMENTS 7,667,577 B2 *  2/2010  Piccolo, III ......... G08B 13/196
                                                 340/309.16
8,023,441 B2 *  9/2011  Werb ..................... G01D 4/004
                                                     370/238
(Continued)

FOREIGN PATENT DOCUMENTS

EP    2034629 A1    3/2009
WO    2015126577    8/2015

OTHER PUBLICATIONS

Chol Su Kang, "Time Slotted, Channel Hopping MAC", IEEE 802.15-08-409-04-004e, Jul. 7, 2008; Slide 33.*

(Continued)

*Primary Examiner* — Andrew Lai
*Assistant Examiner* — Chuong M Nguyen
(74) *Attorney, Agent, or Firm* — Kilpatrick Townsend & Stockton LLP

(57) ABSTRACT

Disclosed are various embodiments for compensating for clock drift between nodes in a time synchronous network. A node receives time synchronization information from a parent node in the network. A drift between a clock of the node and a clock of the parent node is determined based upon the time synchronization information. The node identifies a number of time slots of the network since making a last time synchronization based on previous time synchronization information transmitted from the parent node. A compensation interval is calculated that represents a number of the time slots over which the clock of the node deviated, with respect to the parent node, by a predefined compensation value. The node compensates, by the compensation value, one of the time slots according to the compensation interval.

15 Claims, 5 Drawing Sheets

(51) Int. Cl.
  *H04J 3/06* (2006.01)
  *H04L 12/733* (2013.01)
(52) U.S. Cl.
  CPC ....... *H04W 56/001* (2013.01); *H04W 56/003* (2013.01); *H04W 56/0015* (2013.01)

(56) References Cited

U.S. PATENT DOCUMENTS

| | | | | |
|---|---|---|---|---|
| 8,045,537 | B2* | 10/2011 | Picard | G01D 4/004 |
| | | | | 370/350 |
| 8,194,636 | B1* | 6/2012 | Doherty | H04J 3/0652 |
| | | | | 370/350 |
| 8,953,581 | B1* | 2/2015 | Charles | H04L 7/048 |
| | | | | 370/350 |
| 2004/0005902 | A1 | 1/2004 | Belcea | |
| 2013/0107930 | A1* | 5/2013 | Le Faucheur | H04L 7/0337 |
| | | | | 375/225 |

OTHER PUBLICATIONS

Chol Su Kang, "Time Slotted, Channel Hopping MAC", IEEE 802.15-08-409-04-004e, Jul. 7, 2008; Slides 2 and 33.*
Kang et al., IEEE 802.15-08-409-04-004e; "Time Slotted, Channel Hopping MAC Proposal", Jul. 2008, 33 pages.
Chang, et al., "Adaptive synchronization in multi-hop TSCH networks", Computer Networks, vol. 76, Nov. 15, 2014, pp. 165-176.
Dobson, et al., "Network-level Synchronization in Decentralized Social Ad-Hoc Networks", Pervasive Computing and Applications (ICPCA), 2010 5th International Conference, Dec. 1, 2010, pp. 206-212.
PCT/US2015/013030, "International Search Report and Written Opinion", May 8, 2015, 13 pages.
Ren, et al., "Self-Correcting Time Synchronization Using Reference Broadcast in Wireless Sensor Network", Wireless Communications, IEEE, vol. 15, No. 4, Aug. 1, 2008, pp. 79-85.
International Application No. PCT/US2015/013030, "International Preliminary Report on Patentability", Sep. 1, 2016, 8 pages.

* cited by examiner

CLOCK DRIFT COMPENSATION IN A TIME SYNCHRONOUS CHANNEL HOPPING NETWORK

CROSS-REFERENCE TO RELATED APPLICATIONS

This application claims priority to U.S. Provisional Application No. 61/943,176 filed Feb. 21, 2014, the contents of which are incorporated herein by reference.

BACKGROUND

In a time synchronous channel hopping (TSCH) network, such as that defined by IEEE 802.15.4e, network communication takes place within defined time slots so the nodes of the network are required to be synchronized with each other. Over time, two nodes, such as a node and its parent node, may drift apart due to specification tolerances in their electronics hardware. If the nodes use very accurate oscillators, then the drift may be small. However, at some point, the cumulative drift becomes so large that network stability and performance are adversely impacted or the network fails.

SUMMARY

Various aspects of the present invention relate to compensating for the drift between clocks of radios used to establish a communications link between a node and its parent node in a time synchronous network. In one aspect, a node receives time synchronization information from a parent node in the network. The network may be a TSCH network, such as defined by IEEE 802.15.4e. The node determines a drift between its clock and a clock of the parent node based upon the time synchronization information. The node may begin compensating for the drift by identifying a number of time slots of the network since making a last time synchronization based on previous time synchronization information transmitted from the parent node. In some embodiments, the node determines if the drift meets or exceeds a predefined threshold prior to beginning to compensate for the drift.

Continuing, the node calculates a compensation interval representing a number of the time slots over which the clock of the node deviated, with respect to the parent node, by a compensation value. The node then compensates, by the compensation value, one or more of the time slots according to the compensation interval. The node may continue compensating for the drift using the compensation value and compensation interval until a subsequent drift is determined to meet or exceed the predefined threshold. If the drift does again meet or exceed the threshold, the node may repeat the operations to determine a new compensation interval based on the recent drift value.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
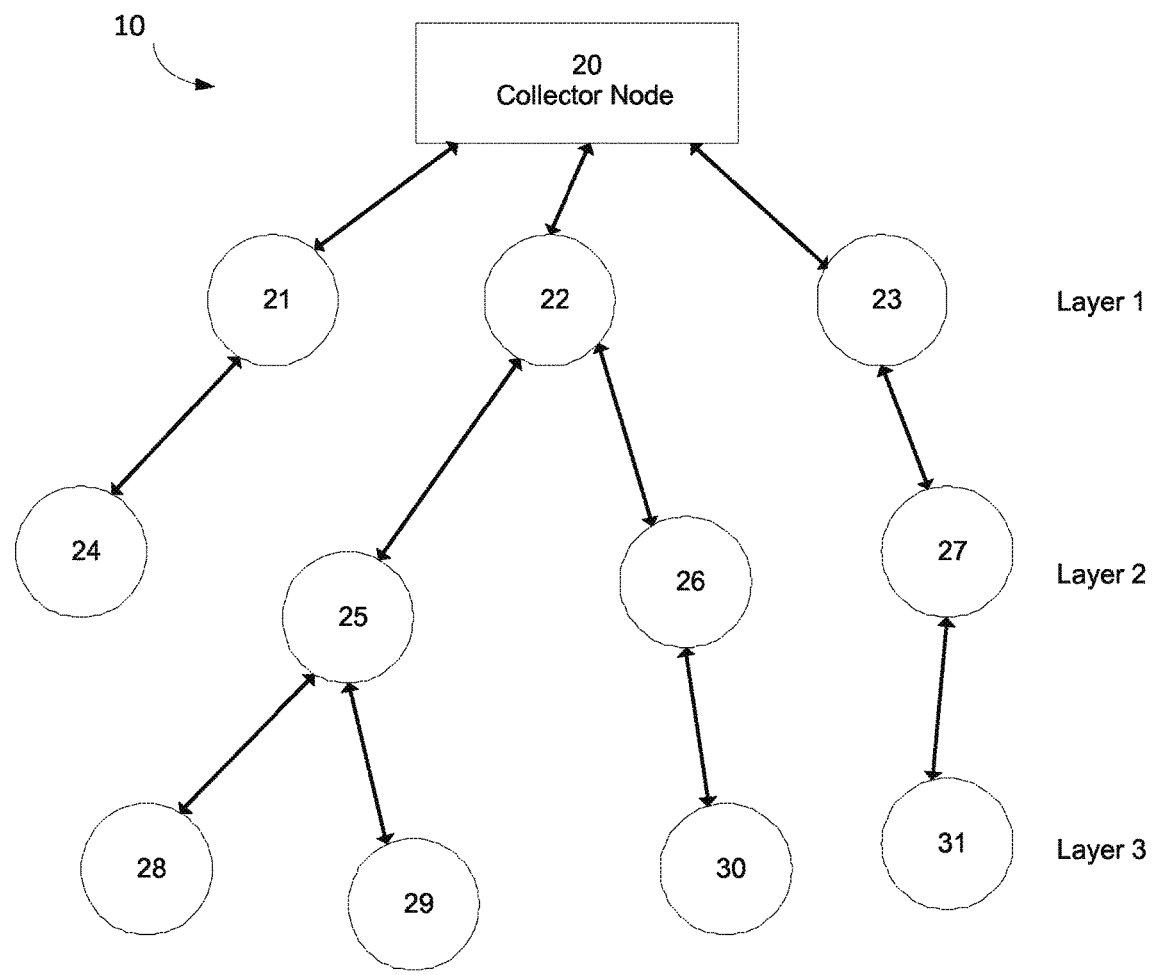
FIG. 1 is a drawing of a mesh network according to various embodiments of the present disclosure.

The techniques disclosed herein are directed to compensating for clock drift between nodes in a time synchronous network, such as a TSCH network. Such compensation can be accomplished by nodes adjusting selected time slots used in the wireless links between the nodes in order to reduce clock drift between a node and its parent node. For example, each node can acquire or identify other nodes with which it can communicate (commonly referred to as neighboring nodes), and obtain certain information and performance metrics about these nodes to facilitate communication. Nodes can use the metrics to score each of the nodes they identified to determine which identified node provides the best option for sending information to a destination and for receiving messages, i.e., a parent node. A node that has identified a parent node may be synonymously be referred to as a child node of the parent node.

By identifying other nodes as explained and establishing communication links with these nodes, each node establishes its own network of nodes which it can leverage for sending and receiving information in the mesh network. A node can rely on its parent node for receiving messages from a central node or other nodes, for example. Nodes track their parent nodes, but the radios used by the nodes to establish communication links can become out of sync as a result of clock drift (or simply referred to as "drift") among the clocks used by the radios. Time synchronization information with which nodes may synchronize their clocks may be shared between nodes using one or more message transmissions. One example is a beacon, but time synchronization information could be carried in other types of messages.

However, frequent transmissions of time synchronization information, as well as the processing overhead associated with requiring a node to frequently synchronize its clock, requires the use of additional electrical power that may be detrimental in, for example, a low-power usage environment, such as battery-powered nodes used in some mesh networks. In order to reduce the reliance upon time synchronization information and frequent synchronization operations, implementations herein emphasize a node adjusting a slot width of selected time slots in a communication link with a parent node.

To this end, in an exemplary embodiment, the drift between a node and its parent node is determined once time synchronization information is received from the parent node. If the drift exceeds a threshold value, the slot width of the selected time slots are adjusted by a predetermined compensation value so that the drift is reduced once the next time synchronization information is received. One example of a predetermined compensation value corresponds to a clock tick of the node's oscillator. The invention makes a small change to the slot width at determined compensation intervals and may calculate new adjustment parameters (e.g. compensation interval, compensation value, etc.) if the drift again exceeds the drift threshold. In this manner, the need for continuous time adjustments to propagate through the network layers is minimized.

As defined herein, a "node" includes an intelligent device capable of performing functions related to distributing messages in a mesh network. In one system, a node can be a meter located at a facility, such as a house or apartment, that measures the consumption of a utility such as gas, water, or electric power. Such a meter can be part of an advanced metering infrastructure (AMI), radio frequency (RF) network. Other examples of nodes include a router, collector or collection point, host computer, hub, or other electronic device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a floppy disk, CD-ROM, DVD, or other storage devices located internal to the node or accessible by the node via a network, for example. A node may also include a crystal oscillator (i.e. a clock) to provide timekeeping and a battery to provide back-up power. Some nodes may be powered only by a battery.

A node can communicate with other nodes in the mesh network over various frequency channels. Nodes that share the same frequency hopping sequence, i.e., hop between frequencies at the same time, can communicate with each other over the same frequency. Thus, in a TSCH network, nodes can hop at different times to establish communication with other nodes over the available frequency spectrum, e.g., 240 channels according to exemplary implementations. A node can hop according to a certain time increment or dwell time, e.g., 700 milliseconds, at which time the node can transmit or receive a message over a given channel or frequency. Each dwell time for a given channel is divided into time slots, which may collectively be referred to as a slot frame. The channels described herein can exist within the 240 channel frequency range, for example, and can be separated by some time increment, such as 700 milliseconds, which can represent the "space" between frequency channels. Thus, according to an exemplary implementation, 240 separate communications can occur simultaneously in the mesh network, each communication occurring on a separate channel. Such communications can utilize the entire bandwidth of the 240 channel network.

As used herein, "time synchronization information" refers to information communicated in a message or sequence of messages from which a node may synchronize the clock used for the radio by which it communicates with other nodes in a mesh network. In some embodiments of a network defined by IEEE 802.15.4e, the time synchronization information may be carried by a beacon. The beacon may be transmitted on a schedule-driven and/or event-driven basis.

As used herein, "compensation value" refers to the amount of time by which the slot width of a time slot for a communication link is to be adjusted by a node for the purpose of drift compensation. The compensation value may be predefined for a given node and the compensation value may be any small adjustment value suitable for the node to adjust the width of a time slot for a wireless communication link. In one implementation, the compensation value is a clock tick.

As used herein, "compensation interval" refers to the determined number of time slots over which a slot width should be adjusted by a compensation value. For example, a compensation interval of 1000 would indicate that the slot width of one slot of every 1000 slots should be adjusted by the compensation value.

Referring now to the drawings, FIG. 1 depicts an exemplary mesh network 10 configured to implement systems described herein. The mesh network 10 can include a collector node 20 and radio nodes 21-31. The collector node 20 can serve as a collection point to which the nodes 21-31 may send information, such as measurements of the consumption of gas, water, or electric power at a facility associated with the node. Nodes 21-31, as previously discussed, can have sufficient networking and computing capability to communicate with other nodes in the mesh network and to make intelligent determinations to facilitate such communication. The "collector node" can be configured to have at least the same functionality and capabilities present in nodes 21-31. Additionally, the collector node 20 may include sufficient storage capability for storing information from nodes 21-31 and, in some examples, greater computing capability to process the information received from the nodes. In other examples, a command center or other computing device (not shown) can be used to process the information received from the nodes.

Three layers of nodes in the mesh network 10 are shown in FIG. 1 (layer 1, layer 2, and layer 3). Fewer or more layers may exist in other configurations. Nodes can be associated with a particular layer based on certain factors, such as a node's logical distance to the collector node 20 and the reliability of its data transmissions. The factors and/or the weights given to the factors may vary with different networks. Nodes located on layer 1 indicate that they have a "better" connection to the collector node 20, and do not require the use of an intervening node to communicate with the collector node 20. Nodes located on higher numbered layers communicate with the collector node 20 through at least one intervening node. For example, nodes located on layer 2 are child nodes to a layer 1 parent node, and nodes located on layer 3 are child nodes to a layer 2 parent node (i.e. here, layer 2 nodes can serve both parent and child roles in different node pairings). Thus, a layer 3 node communicates with the collector node through its parent layer 2 node, which in turn communicates with its parent layer 1 node, which communicates with the collector. While FIG. 1 shows layer 1 nodes being closer to the collector node 20 than layer 2 nodes, and layer 2 nodes closer than layer 3 nodes, the layers may not be determined solely by physical distance. A layer 1 node may be located further away from the collector node 20 than a layer 2 node, depending upon the manner in which the nodes are evaluated.

Figure 2:
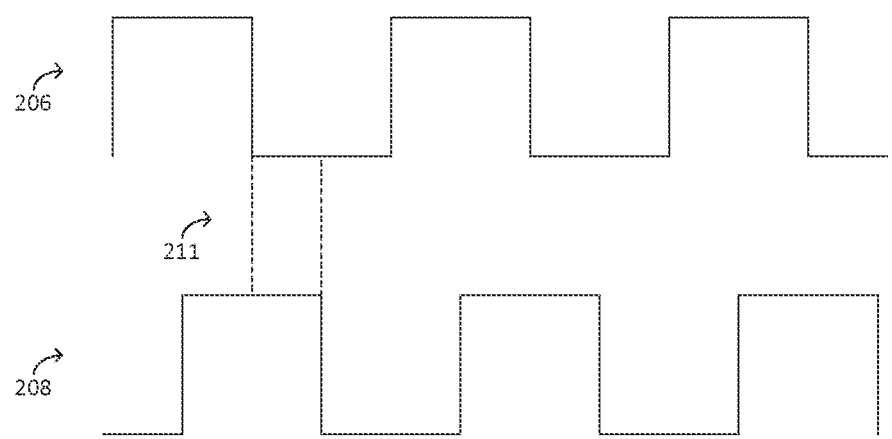
FIGS. 2 and 3 are clock synchronization diagrams for nodes in a mesh network according to various embodiments of the present disclosure.

As described previously, during normal operation, the clocks used by the radios of the nodes 21-31 for communicating on the mesh network 10 may drift from a synchronized state due to variations and/or imprecision in the clocks. Shown in FIG. 2 is a clock synchronization diagram illustrating an example of the drift that may occur between a clock signal 206 for the radio of a parent node and a clock signal 208 for the radio of a child node in communication with the parent node. The clock synchronization diagram in FIG. 2 presents an exemplary result of the typical variance that accumulates between the radios of a pair of nodes over time. The difference in the corresponding positions of the edges of the clocks signals 206, 208 represents the drift 211.

Returning to FIG. 1, using the techniques disclosed herein, the drift among the nodes 21-31 of the mesh network 10 can be minimized, thereby improved long-term time synchronization among the nodes 21-31. As a result, performance and efficiency of the mesh network 10 may be improved, while potentially reducing power consumption for the nodes 21-31 by reducing the number of time synchronization operations required. In order to reduce the reliance upon time synchronization information and frequent synchronization operations, a child node may adjust the widths of one or more of the time slots used for the communications links in a time-slotted network to compensate for the drift observed between the radios of a node and its parent node.

To this end, once a node 21-31 receives the first time synchronization information from its parent node, the node 21-31 may synchronize its own clock to the clock of its parent node. Thereafter, upon receiving subsequent time synchronization information from the parent node, the node 21-31 may determine the amount of drift between its own clock and the clock of the parent node. If the drift does not meet or exceed a threshold, no adjustment with respect to the parent node (i.e. using the time synchronization information) is performed.

In an embodiment, if the drift does meet or exceed a threshold value, the node 21-31 may determine the number of time slots of the communications link between it and its parent node that have passed since the last time adjustment based on the time synchronization information. As described in greater detail later in the disclosure, based on the amount of drift since the last time adjustment and the number of time slots passed since the last adjustment, the node may determine the number of time slots over which an amount of drift equivalent to a predefined compensation value would have occurred, i.e. the compensation interval. Thereafter, the node may adjust the time slots according to the compensation interval (e.g. adjust one time slot out of every 1000 time slots), where the adjustment made within each interval is equal to the compensation value (e.g. adjusting one time slot out of every 1000 slots by 4 μs). Using this technique, the drift may be compensated for in an incremental, controlled manner and minimize abrupt changes in the clocking of the communication links that could disrupt communication among various nodes.

Figure 3:
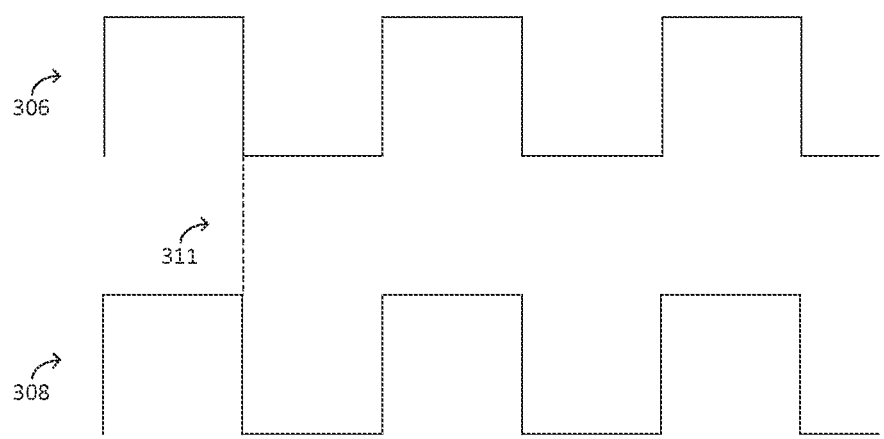

For example, if a drift of 200 μs is detected and 20,000 time slots have passed since a last time adjustment, this would result in an average of 1 μs of drift for every 100 time slots. Continuing the example, if a desired compensation value is predefined to be 4 μs, then adjusting one time slot out of every 400 time slots by the compensation value of 4 μs would result in compensating for the drift over the next 20,000 time slots. As a result of compensating for the drift in the above example, the clock synchronization diagram in FIG. 3 illustrates an example of the synchronization between the clock signal 306 for the radio of the parent node and a clock signal 308 for the radio of the node in communication with the parent node. The difference in the corresponding positions of the edges of the clocks signals 306, 308 represents the drift 311, which currently presents no discernible drift between the nodes.

Returning to FIG. 1, the drift compensation operations applied to the time slots may continue using the same adjustment parameters until the drift is determined to again meet or exceed the threshold. If this occurs, the node may repeat the operations to determine a new drift compensation interval using the recent drift value and the number of time slots that have passed since the most recent time synchronization with the parent node.

Figure 4:
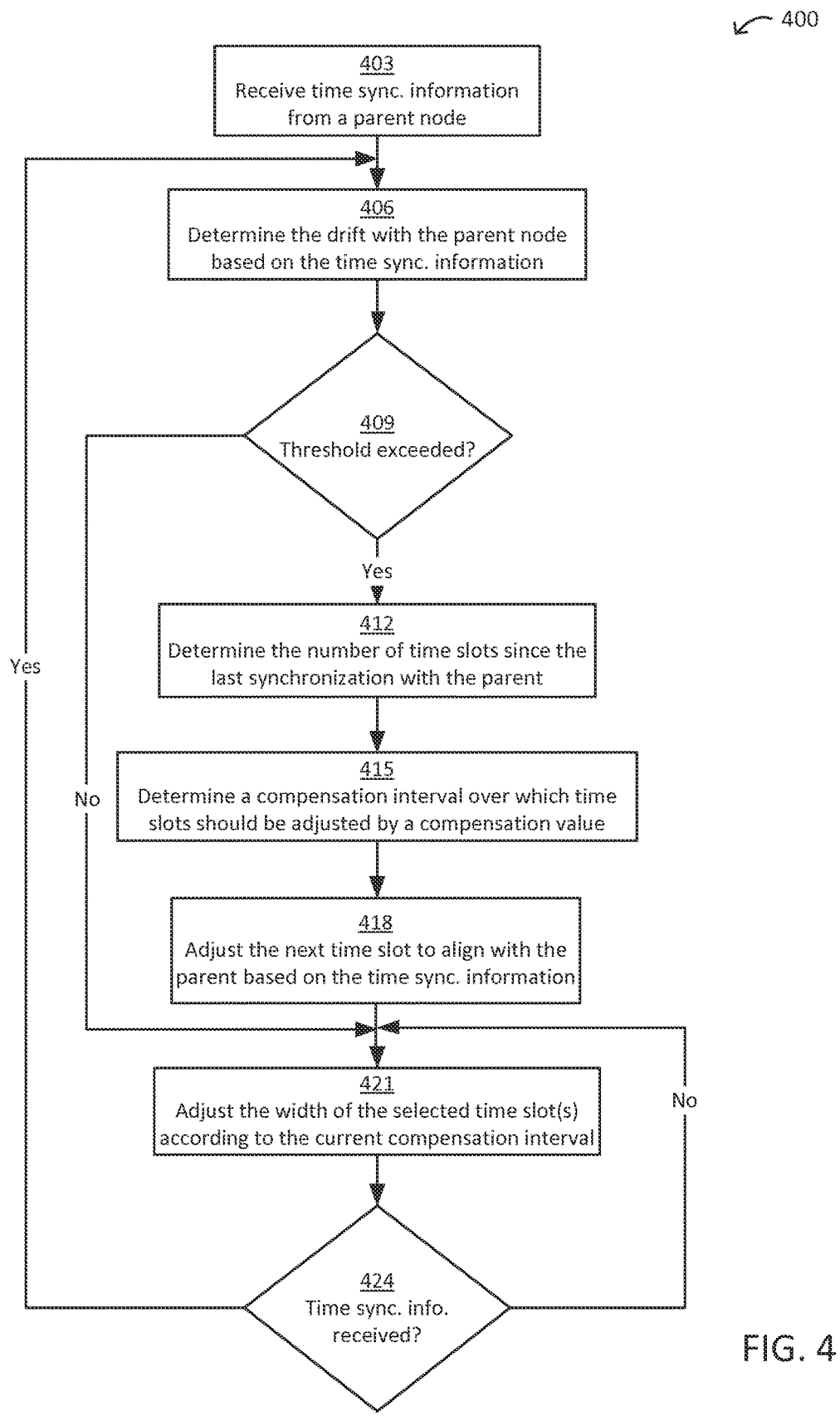
FIG. 4 is a flowchart illustrating one example of functionality implemented by a node in the mesh network of FIG. 1 according to various embodiments of the present disclosure.

Referring next to FIG. 4, shown is a flowchart that provides one example of the drift compensation operations for a method 400 of a child node in the mesh network 10 according to various embodiments. It is understood that the flowchart of FIG. 4 provides merely an example of the many different types of functional arrangements that may be employed to implement the drift compensation operations of the method 400 as described herein. The operations depicted in the flowchart of FIG. 4 may be initiated by a node in the mesh network 10 after the node has previously synchronized time to its parent node.

Beginning with block 403, a node receives time synchronization information from the its parent node with which the node may compare its local clock to the clock of the parent node. In some embodiments of a TSCH network, such as defined by IEEE 802.15.4e, the time synchronization information may be embodied as a beacon message. Next, in block 406, the node may determine the amount of drift that has occurred between its own clock and the clock of the parent node since the most recent time synchronization was performed using the time synchronization information.

Then, in block 409, the node determines whether the drift exceeds a predefined drift threshold. As a non-limiting example, the node may have predefined a drift threshold of 128 μs, such that drift compensation is begun or adjusted only if the drift between the node and its parent node meets or exceeds this drift threshold. Returning to the description of the flowchart, if in block 409, the drift is less than the drift threshold, then the method 400 proceeds to block 421.

Alternatively, if the drift threshold is met or exceeded, in block 412, the node may determine the number of time slots of the communications link shared with the parent node that have passed since the last time adjustment based on the time synchronization information received via the mesh network 10. In an embodiment, the following function may be used to calculate the number of time slots elapsed since the last time synchronization:

$$(\text{elapsed time}) \cdot (\text{time slot frequency}) = \text{slots elapsed}$$

In the above function, the elapsed time is the time that has elapsed since the last time adjustment operation by the node using time synchronization information; the time slot frequency is the rate at which the time slots occur for the communication link between the parent node and child node; and the slots elapsed is the number of time slots that have elapsed since the previous time adjustment using time synchronization information. For example, if 10 sec have elapsed since the last time adjustment and the time slots occur at a frequency of 40 slots per second (i.e. 1 slot every 25 ms), then 400 time slots have passed since the last time synchronization.

Continuing, in block 415, the node then determines a compensation interval at which one or more time slots of the wireless communications link are to be adjusted by a compensation value in order to compensate for the observed drift with the parent node. In an embodiment, the following function may be used to determine the compensation interval:

$$(\text{slots elapsed}) \cdot (\text{compensation value}) / (\text{drift}) = \text{compensation interval}$$

In the above function, slots elapsed are the number of slots that have elapsed since the last time synchronization;

drift is the amount of clock drift observed between the child node and the parent node based on the most recent time synchronization information; compensation value is the predefined amount by which one or more of the time slots should be adjusted; and compensation interval is the number of time slots from which one time slot will be adjusted (e.g. a compensation interval of 100 means 1 time slot of every 100 time slots should be adjusted).

For example, if a drift of 200 µs is detected and 20,000 time slots have passed since a last time adjustment, using a compensation value predefined to be 4 µs would result in a compensation interval of 400 time slots, meaning one of every 400 time slots should be adjusted by an amount equal to the compensation value. In one implementation, the compensation value is based on the clock period or clock ticks of the node.

As another example, if a drift of 223 µs is detected and 5,045 time slots have passed since a last time adjustment, using a clock tick of 4.26 µs as the compensation value would result in a compensation interval of approximately 96 time slots, meaning one of every 96 time slots should be adjusted by an amount equal to the clock tick. As a result of alignment of the compensation interval to a whole-numbered time slot boundary (i.e. not using a compensation interval of 96.375) and/or other constraints on mathematical precision, the adjustment operations may not precisely compensate for all of the observed drift. In the current example, compensating one time slot of every 96 slots by 4.26 µs would result in compensating for approximately 223.9 µs over the next 5,045 time slots.

Next, in block 418, prior to beginning the compensation using the compensation interval determined in block 415, the node may use the received time synchronization information to adjust the next time slot to align with the parent such that the clocks of the node and its parent are again synchronized. By performing another time synchronization, the clock for the node may begin in a synchronized state and, using the techniques disclosed herein, may be adjusted according to the drift expected between the parent and the child that is based on the observed drift.

Then, in block 421, the node may begin to compensate for the observed drift with the clock of the parent node by adjusting the width of the selected time slots according to the compensation interval and compensation value. Continuing, in block 424, the node determines whether other time synchronization information was received. If other time synchronization information was received, the method 400 for the node returns to block 406. Alternatively, if other time synchronization information has not yet been received, then in block 421, the node continues the drift compensation operations applied to the time slots using the same compensation interval and compensation value previously determined.

Figure 5:
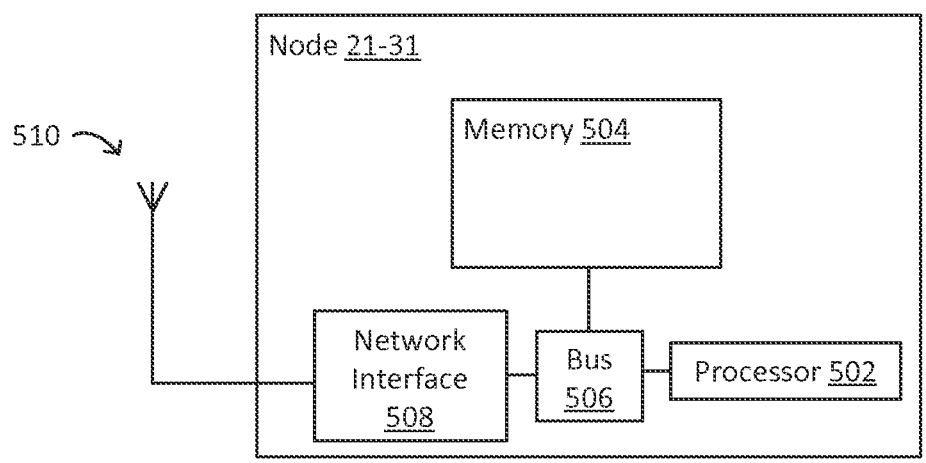
FIG. 5 is a schematic block diagram that provides one example illustration of a node employed in the mesh network of FIG. 1 according to various embodiments of the present disclosure.

Next, in FIG. 5, shown is a block diagram depicting an example of a node 21-31 used for implementing the techniques disclosed herein within a wireless mesh network or other data network.

The node 21-31 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 21-31 can include a bus 506 that can communicatively couple one or more components of the node 21-31. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a node 21-31 to store and execute programming code.

The nodes 21-31 can also include network interface device 508. The network interface device 508 can be a transceiving device configured to establish a one or more of the wireless communication links via an antenna 510. A non-limiting example of the network interface device 508 is an RF transceiver and can include one or more components for establishing a communication links to other nodes 21-31 in the mesh network 10.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for clock drift compensation by a processor of a node in a network, comprising:
    receiving time synchronization information from a parent node in the network;
    determining a drift between a clock of the node and a clock of the parent node based upon the time synchronization information;
    determining a number of time slots of the network that have elapsed since making a last time adjustment based on previous time synchronization information received from the parent node;
    calculating a number of clock ticks in the drift;
    calculating a number of elapsed time slots that resulted in one clock tick of drift by dividing the number of time slots by the number of clock ticks to obtain a compensation interval;
    using the compensation interval to compensate a selected time slot by one clock tick, wherein the selected time slot corresponds to one time slot within the compensation interval; and
    repeating said compensating using a same value for the compensation interval until a subsequent drift, based on subsequent time synchronization information, meets or exceeds a predefined drift threshold, wherein the subsequent drift meeting or exceeding the predefined drift threshold triggers calculating a new value for the compensation interval.

2. The method of claim 1, wherein the steps of determining the number of time slots, calculating, and using are performed when the drift meets or exceeds the predefined drift threshold.

3. The method of claim 1, wherein when the subsequent drift meets or exceeds the predefined drift threshold, further comprising:
    identifying a subsequent number of time slots of the network since said synchronizing the clock of the node;
    calculating a subsequent compensation interval representing a subsequent number of the time slots over which the clock of the node deviated by one clock tick with respect to the parent node; and
    compensating, by one clock tick, one of the time slots according to the subsequent compensation interval.

4. The method of claim 1, wherein the network is defined by Institute of Electrical and Electronics Engineers (IEEE) 802.15.4e.

5. The method of claim 4, wherein the time synchronization information is transmitted in a beacon on the network.

6. The method of claim 1, wherein the node is also a parent node to another node in the network.

7. A non-transitory computer-readable medium embodying a program executable in a node device of a network, comprising:
    code that receives time synchronization information, via the network, from a parent node of the node;
    code that determines a drift between a clock of the node and a clock of the parent node based upon the time synchronization information; and
    code that compensates for the drift when the drift meets or exceeds a predefined drift threshold, comprising:
        code that identifies a number of time slots of the network that have elapsed since making a last time adjustment based on previous time synchronization information received from the parent node;
        code that determines a compensation interval for a predetermined compensation value by calculating a number of the time slots over which the clock of the node deviated, with respect to the parent node, by the compensation value;
        code that uses the compensation interval and the compensation value to adjust a selected time slot within the compensation interval so that a duration of the selected time slot is adjusted by the compensation value and the selected time slot is one time slot within the compensation interval; and
        code that repeats said adjusting using a same value for the compensation interval until a subsequent drift, based on subsequent time synchronization information, meets or exceeds the predefined drift threshold, wherein the subsequent drift meeting or exceeding the predefined drift threshold triggers calculating a new value for the compensation interval.

8. The non-transitory computer-readable medium of claim 7, wherein the network is a mesh network defined by Institute of Electrical and Electronics Engineers (IEEE) 802.15.4e.

9. The non-transitory computer-readable medium of claim 7, wherein the compensation value is equal to a clock tick of the clock of the node.

10. The non-transitory computer-readable medium of claim 7, wherein the node is also a parent node to another node in the network.

11. A node, comprising:
a processor;
a network interface for communicating on a network; and
a memory configured by a drift compensation application executed in the node, the drift compensation application causing the node to:
receive time synchronization information, via the network, from a parent node of the node;
determine a drift between a clock of the node and a clock of the parent node based upon the time synchronization information;
when the drift meets or exceeds a predefined threshold, the drift compensation application further causes the node to:
identify a number of time slots of the network since making a last time synchronization based on previous time synchronization information transmitted from the parent node;
calculate a compensation interval representing a number of the time slots over which the clock of the node deviated, with respect to the parent node, by a predefined compensation value; and
compensate, by the compensation value, ones of the time slots according to the compensation interval, until a subsequent drift, based on subsequent time synchronization information, meets or exceeds the threshold, wherein the subsequent drift meeting or exceeding the threshold triggers calculating a new value for the compensation interval.

12. The node of claim 11, wherein the node is also a parent node to another node in the network.

13. The node of claim 12, wherein an adjustment to the clock of the node affects a drift between the clock of the node and a clock of the other node.

14. The node of claim 11, wherein when the subsequent drift meets or exceeds the threshold, further comprising:
identifying a subsequent number of time slots of the network since said synchronizing the clock of the node;
calculating a subsequent compensation interval representing a subsequent number of the time slots over which the clock of the node deviated by the compensation value with respect to the parent node; and
compensating, by the compensation value, one of the time slots according to the subsequent compensation interval.

15. The node of claim 11, wherein the network is a time synchronous channel hopping (TSCH) network.

* * * * *